Patented Sept. 19, 1939

2,173,205

UNITED STATES PATENT OFFICE 2,173,205

PROCESS FOR THE DEOXIDATION OF STEEL BATHS

Otto Johannsen, Volklingen, Saar, Germany, assignor to Röchling'sche Eisen- und Stahlwerke Gesellschaft mit beschränkter Haftung Volklingen, Saar, Germany No Drawing. Application December 23, 1937, Serial No. 181,373. In Germany December 28, 1936

5 Claims. (Cl. 75—57)

It has often been proposed to employ calcium carbide for the deoxidation of steel baths but this was not successful because the melting point of the calcium carbide is too high. Certainly the calcium carbide can be previously melted down in the electric furnace but the melted product solidifies when it comes into contact with the steel bath. It has likewise been proposed to employ calcium cyanamide as deoxidizing means but its melting point is also too high.

According to the invention the melting point of the carbide is lowered by the addition of fluor spar so far that a liquid slag forms on the steel bath. Small quantities of other fluorides, such as cryolite, are preferably added to this mixture. However, small additions of other substances might also be used to render the fused mass more liquid, for example, silicon and the like. The following mixture has been found suitable in practice:—

|  | Per cent |
|---|---|
| Calcium carbide | 50 |
| Fluor spar | 40 |
| Cryolite | 10 |

According to the invention either each admixture alone or all admixtures together can be mixed with calcium carbide or directly melted with the same. Such mixed products can also be manufactured even during the preparation of calcium carbide. The deoxidation of the steel bath is effected by adding to the bath the mixtures of calcium carbide and of the said additions in cold, preheated or melted condition the mass being in the last instance melted in a suitable furnace. By carrying out the process in a practical manner, for example by pouring or tipping the mass into the jet of liquid metal, a thorough mixing and stirring is ensured.

When treating the steel with the above mentioned means the commonly used manganese admixture is saved either entirely or to a great extent. Experiments have shown a hundred percent utilization of the manganese added after the treatment; the carbide had consequently completely extracted the oxygen from the steel bath. According to this process a perfect Thomas steel was produced with 0.20% manganese. The steel produced was poor in sulphur, rusted only slightly and was at least equivalent to the steel deoxidized with manganese in the usual manner.

I claim:

1. A method for the deoxidation of finished steel outside the furnace, consisting in using for the deoxidation a mixture of calcium carbide and fluor spar in which the calcium carbide amounts to 40 to 60% and the fluor spar to 60 to 40%.

2. A method for the deoxidation of finished steel outside the furnace, as specified in claim 1, in which the deoxidation mixture contains cryolite in addition to calcium carbide and fluor spar, in which case the calcium carbide amounts to 40 to 60%, the fluor spar to 50 to 30% and the cryolite to 5 to 20%.

3. A method for the deoxidation of finished steel outside the furnace, as specified in claim 1, in which the deoxidising mixture contains small quantities of other substances reducing the melting point of the mixture in addition to calcium carbide and fluor spar, in which case the calcium carbide amounts to 40 to 60%, the fluor spar to 50 to 30% and the other substances to 5 to 20%.

4. A method for the deoxidation of finished steel outside the furnace, as specified in claim 1, in which the mixture is pre-heated and contains cryolite and other substances reducing the melting point of the mixture in addition to calcium carbide and fluor spar.

5. A method for the deoxidation of finished steel outside the furnace, as specified in claim 1, in which the mixture is pre-melted and contains cryolite and other substances reducing the melting point of the mixture in addition to calcium carbide and fluor spar.

OTTO JOHANNSEN.